No. 629,732. Patented July 25, 1899.
L. E. WATERMAN.
WHEELED PLOW.
(Application filed Jan. 14, 1899.)
(No Model.)
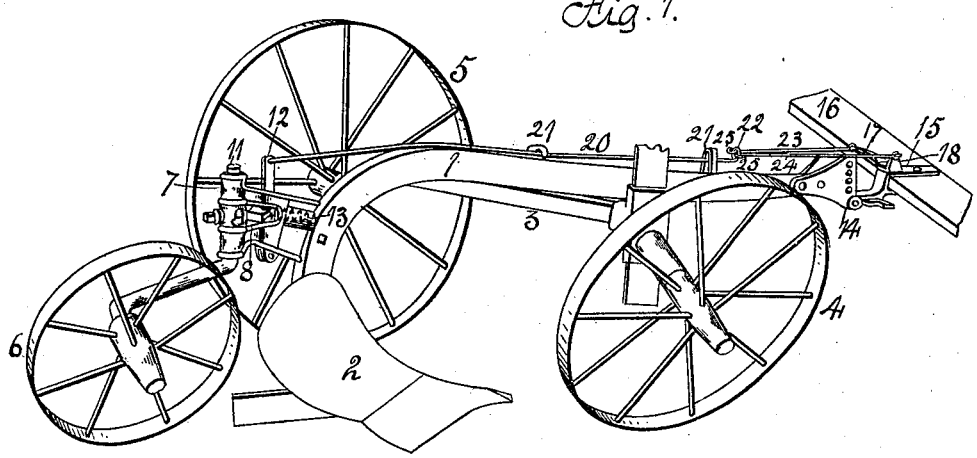
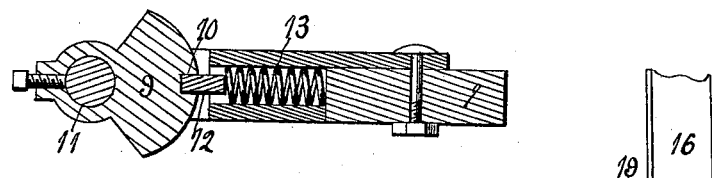
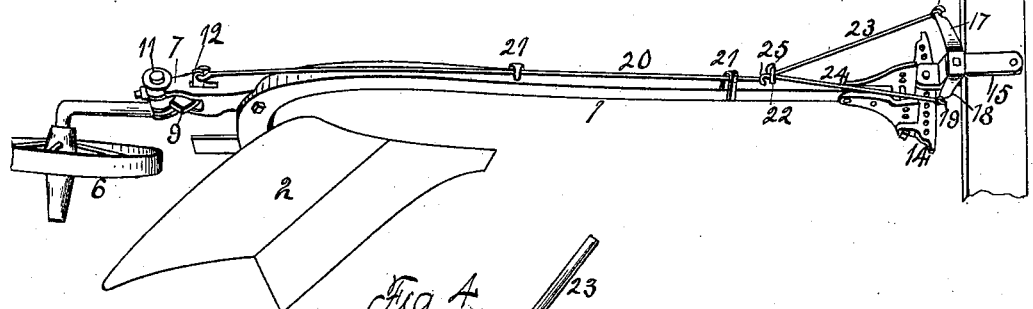
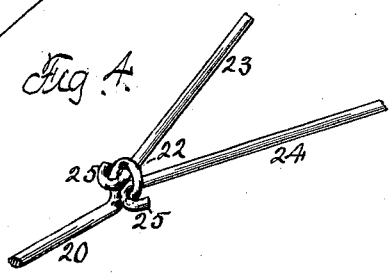
Witnesses:
Inventor:
Lewis E. Waterman
By A. O. Behel
Atty.
THE NORRIS PETERS CO., PHOTO-LITHO., WASHINGTON, D. C.

UNITED STATES PATENT OFFICE.

LEWIS E. WATERMAN, OF MOLINE, ILLINOIS, ASSIGNOR TO THE EMERSON MANUFACTURING COMPANY, OF ROCKFORD, ILLINOIS.

WHEELED PLOW.

SPECIFICATION forming part of Letters Patent No. 629,732, dated July 25, 1899.

Application filed January 14, 1899. Serial No. 702,200. (No model.)

*To all whom it may concern:*

Be it known that I, LEWIS E. WATERMAN, a citizen of the United States, residing at Moline, in the county of Rock Island and State of Illinois, have invented certain new and useful Improvements in Wheeled Plows, of which the following is a specification.

The object of this invention is to liberate the caster-wheel by the movement of the evener in the team turning corners.

In the accompanying drawings, Figure 1 is a perspective view of a portion of a wheeled plow embodying my invention. Fig. 2 is a perspective view of my improvements as seen from the top. Fig. 3 is a horizontal section through the caster-wheel support and locking-lever. Fig. 4 is a perspective view of the linked connection between the caster-wheel and evener.

The plow in the main is of an old construction, and consists of the beam 1, plow 2, axle 3, furrow-wheel 4, land-wheel 5, and caster-wheel 6. The caster-wheel is supported by a bracket 7, secured to the plow-beam. The bracket has an opening 8, within which is placed a segment 9, provided with a notch 10 and secured to the shank 11 of the caster-wheel. A latch 12 is pivoted to the bracket and is held within the notch of the segment by the force of the spring 13.

To the forward end of the plow-beam is secured a clevis 14, and to the clevis is pivoted an evener-support 15. The evener 16 is bolted to the support.

To the evener-support is secured a bracket having the arms 17 and 18, their outer ends terminating in hooks 19.

A rod 20 has a connection with the upper end of the latch 12 and extends in the lengthwise direction of the plow-beam and is guided in loops 21, extending from the plow-beam. The forward end of this rod is formed into an eye 22 and stands in a vertical position. To the arms 17 and 18 of the bracket, secured to the evener, are connected links 23 and 24 by an eye engaging the hook of the bracket. The outer ends of these links have a hook 25. These links are passed through the eye of the rod and connected to the arms 17 and 18, when they appear as shown in the drawings.

When the plow is in working position, the caster-wheel will be locked in connection with the plow-beam, and in turning to the left the hook of the link 24 will engage the eye 22 of the rod 20 and move the latch 12 out of engagement with the notch 10 of the segment 9; thereby liberating the caster-wheel, and the link 23 will move through the eye 22. In turning to the right the link 23 will draw on the rod 20 and liberate the latch and the link 24 will move through the eye 22, and upon the team drawing in a straight line both links remain neutral and the caster-wheel will be locked in position.

I am aware that it is old to liberate the caster-wheel by a lateral movement of the pole, also by a frictional connection between the caster-wheel support and main frame; but I am not aware that the caster-wheel of a tongueless wheeled plow has been liberated by the turning action of the team independently of the turning movement of the furrow-wheel.

I claim as my invention—

1. In a tongueless wheeled plow, a main frame, a furrow-wheel, a caster-wheel and means for liberating the caster-wheel by the turning movement of the team independent of the turning movement of the furrow-wheel.

2. In a tongueless wheeled plow, a main frame, a furrow-wheel, a caster-wheel, an evener, and a connection between the wheel and evener independent of the furrow-wheel.

3. In a wheeled plow, the combination of a main frame, a caster-wheel, an evener, a latch for the caster-wheel, a connection between the latch and evener consisting of a rod connected with the latch and extending forward, its end turned in eye form, two links passing through the eye and connected to the evener.

4. In a wheeled plow, the combination of a main frame, a caster-wheel, an evener, a latch for the caster-wheel, a bracket movable with the evener having two arms, one extending each side of the pivoted connection between the evener and plow-beam, a rod connected with the latch having an eye at its free end, two links passing through the eye and connected with the arms of the bracket, the free end of the links in hook form.

LEWIS E. WATERMAN.

Witnesses:
ARTHUR COLVIN,
A. O. BEHEL.